(12) United States Patent
Valeria

(10) Patent No.: US 7,058,816 B2
(45) Date of Patent: Jun. 6, 2006

(54) APPARATUS AND METHOD FOR CONTENT ENTRY MANAGEMENT

(75) Inventor: Brandon Valeria, Redmond, WA (US)

(73) Assignee: Digeo, Inc., Kirkland, WA (US)

( * ) Notice: Subject to any disclaimer, the term of this patent is extended or adjusted under 35 U.S.C. 154(b) by 769 days.

(21) Appl. No.: 10/106,834

(22) Filed: Mar. 26, 2002

(65) Prior Publication Data

US 2002/0188847 A1      Dec. 12, 2002

Related U.S. Application Data

(60) Provisional application No. 60/296,315, filed on Jun. 6, 2001.

(51) Int. Cl.
*G06F 1/24* (2006.01)
(52) U.S. Cl. .................. 713/182; 713/200; 713/201
(58) Field of Classification Search ............... 713/182, 713/200, 201
See application file for complete search history.

(56) References Cited

U.S. PATENT DOCUMENTS

| | | | | |
|---|---|---|---|---|
| 4,884,217 A | * | 11/1989 | Skeirik et al. | 706/56 |
| 5,794,006 A | | 8/1998 | Sanderman | 709/223 |
| 5,815,665 A | * | 9/1998 | Teper et al. | 709/229 |
| 6,199,082 B1 | | 3/2001 | Ferrel et al. | 707/522 |
| 6,314,409 B1 | | 11/2001 | Schneck et al. | 705/54 |

* cited by examiner

*Primary Examiner*—Thomas R. Peeso
(74) *Attorney, Agent, or Firm*—Kory D. Christensen; Stoel Rives LLP

(57) ABSTRACT

A method of managing local content data, includes: determining if a user is authorized to edit a particular content related to a particular region; editing a local content related to the particular region; processing the local content; and if the local content has been selected for publication, then permitting access to the local content. An apparatus for managing local content data, includes: a content tool configured to permit the edit of local content related to a particular region for an authorized user; and a processor configured to execute the content tool to permit edit of the local content.

11 Claims, 5 Drawing Sheets

APPARATUS AND METHOD FOR CONTENT ENTRY MANAGEMENT

CROSS-REFERENCE TO RELATED APPLICATION

This application claims priority to and the benefit of U.S. Provisional Application No. 60/296,315, by common inventor, Brandon Valeria, filed Jun. 6, 2001, and entitled "CONTENT MANAGEMENT TOOL". Application No. 60/296,315 is fully incorporated herein by reference.

TECHNICAL FIELD

This disclosure relates interactive television systems, and more particularly to an apparatus and method for content entry and management.

BACKGROUND

Various tools are available for data entry to permit a user to select a database for storing data, to select tables in the database for editing the data, and to edit form fields in the tables to permit data entries and edits. Such tools include, for example, JDeveloper from ORACLE CORPORATION and CM Generator from VIGNETTE CORPORATION. These available tools typically permit the user to enter or edit data in the database by use of simple HTML-type form pages to perform data edits.

However, the products and methods described above are limited to particular capabilities, functionalities, and/or features. For example, the above-mentioned products would require additional code to be created in order to enhance the capabilities and functionalities of these products.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Disclosed herein are embodiments of an apparatus and method for local content entry and management. As an overview, an embodiment of the invention provides an apparatus and method for content management that permit local stringers (i.e., reporters) to enter, edit, review, and/or delete data that can be stored in a database and displayed to regions in, for example, the continental United States. In another embodiment, an apparatus and method for content management permits each user for a particular region to edit the content if the user is given authorization for editing tasks. Thus, only users that are provisioned for particular regions can edit particular contents for the particular regions.

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Figure 1:
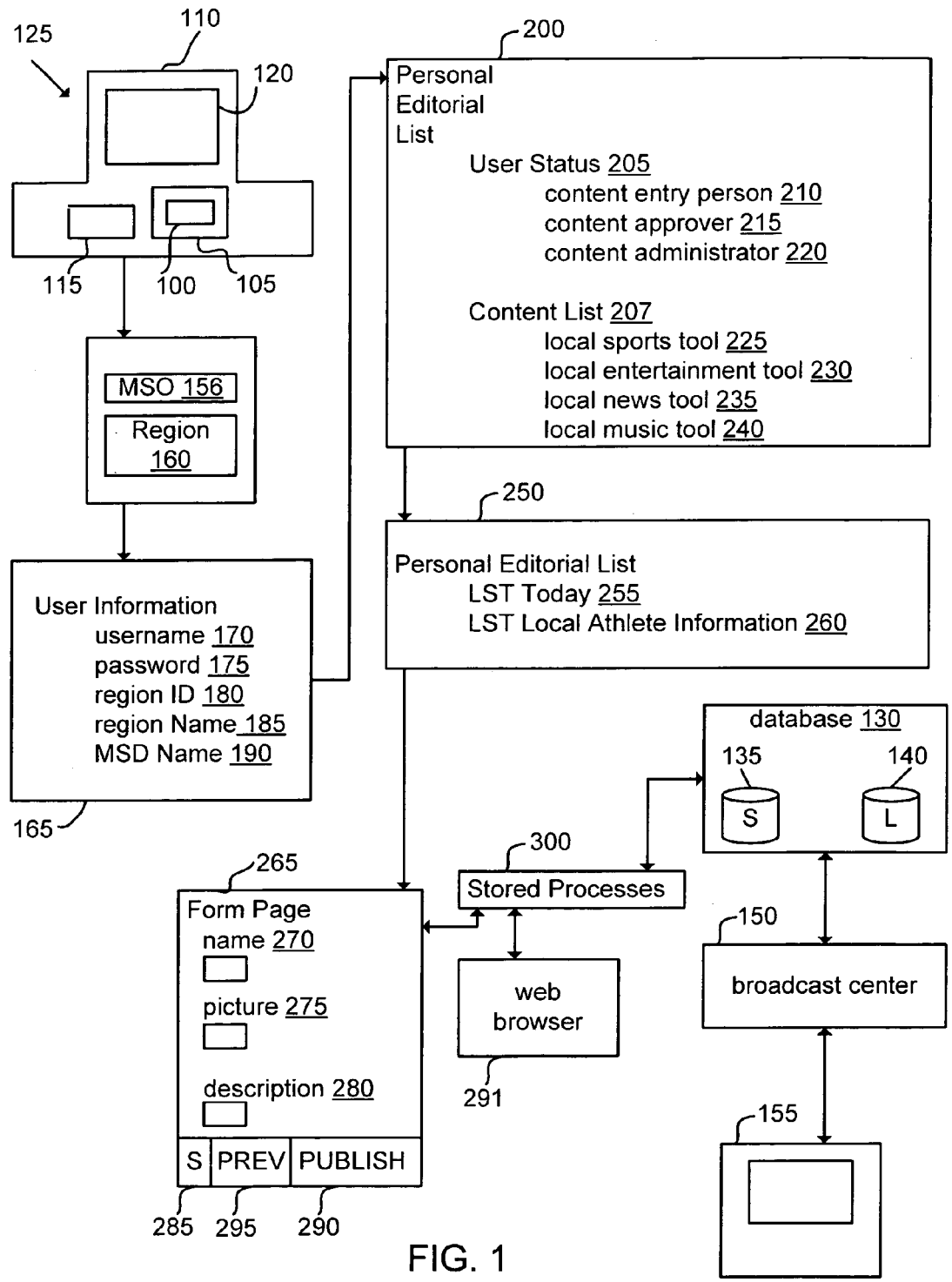
FIG. 1 is a block diagram of an apparatus for local content entry and management according to an embodiment of the invention.

An illustrative example of a specific embodiment of the invention will now be described with reference to FIG. 1. A content entry and management tool (content tool) 100 may be, for example, installed in a memory 105 of a computer 105. The computer 110 includes a processor 115 for executing the content tool 100 to permit the various methods described below. The computer 110 may include or may be coupled to a display screen 120 for displaying the data of content 125 received from a multiple-system operator (MSO) or the data of content 125 that is retrieved from a database system 130.

The computer 110 may be, for example, a personal computer, handheld computing device, laptop or notebook computer, server, workstation, or other types of computing devices.

The computer 110 can communicate with the database system 130. In one embodiment, the database system 130 includes a "save" database 135 and a "live" database 140. However, the functions of the database 135 and 140 may be combined in a single database. The functions of the database 135 and 140 are described below.

A broadcast center 150, such as a cable headend, can access the content 125 stored in the database system 130 and provide the content 125 to at least one subscribing display device 155. Alternatively, the broadcast center 150 can be a service provider such as, for example, digeo, inc., Kirkland, Wash.

In one embodiment, content 120 can be received from one or more multiple-system operator (MSO) 156, where each region 160 in the country may be, for example, assigned to a particular MSO 156. A user (e.g., a local stringer or local reporter) may use the computer 110 and the content tool 100 to perform the below-described editing tasks for the content received from an MSO. In one embodiment, a user may edit at least one particular content 120 from a region. Thus, there may be multiple stringers that are assigned to a region. For example, a first stringer may be authorized to edit sports-related content from a particular region, while a second stringer may be authorized to edit entertainment-related content from that same particular region. In addition or alternatively, a user may edit content 120 from multiple regions. In one embodiment, ZIP codes or the like may be used for differentiating local content from non-local content.

A user can be permitted or provisioned to edit a particular content 120 from a region if the user provides the correct user information. For example, the content tool 100 can provide a user information page 165 where the user can enter: (1) the name 170 of the user, (2) the password 175 of the user, (3) the identification 180 and name 185 of a region, (4) the MSO name 190. The user information that is required from the user via user information page 165 may vary.

If the user is approved or provisioned to edit content 120 in a region, then the content tool 100 may provided a personal editorial list page 200. In one embodiment, the personal editorial list page provides a selection 205 for a user's status and a content list 207 that can be edited. For example, the selection 205 may include "content entry person" 210 (a user with content-entry only authorization), "content approver" 215, and/or "content administrator" 220, and/or other status indicators. The editable content list 207 may include, for example, "local sports tool" page 225, "local entertainment tool" page 230, "local news tool" page 235, and/or "local music tool" page 240, and/or other content links that the user is approved to edit. The items listed in the user status list 205 and editable content list 207 may vary.

In one embodiment, once a link in the content list 207 is selected by the user, the content tool 100 will load a personal editorial list page 250 that provides, for example, hypertext markup language (HTML) links to permit the user to navigate through different pages and content.

Assume that the user is provisioned (authorized) to edit local sports content for a region. Thus, the user can select the "local sports tool" page 225 in the personal editorial list page 200. The content tool 100 can then provide, for example, a personal editorial list page 250 which may have links with editable content. In the example of a specific embodiment shown in FIG. 1, the personal editorial list page 250 provides the links "local sports tool" Today (sports news) page 255 and/or "local sports tool" local athlete information page 260. However, the number of links to editable content in the personal editorial list 250 may also vary.

The user can edit content in the LST Today page 255 or in the LST local athlete information page 260 in the personal editorial list page 250. Assume, for example, that the user selects the LST local athlete information page 260 for editing. The content tool 100 can then provide a form page 265 for that particular editable content to allow the user to edit content data. The form page 265 includes at least one field where the user can enter, edit, or delete data relating to a content 125. In an example of the specific embodiment shown in FIG. 1, the form page 265 includes the following fields: a name field (name of local athlete) 270, picture field (picture of local athlete) 275, and description field (information about the local athlete) 280.

In one embodiment, the content tool 100 permits the user to preview, save, and/or publish content 125 that has been edited in a form page 265. Typically, after the user has edited content data in a form page 265, the user is required to save the edited content data before the edited content data can be published (or broadcast) via display device(s) 155. The user can, for example, save edited content data by selecting the save button 285 and can publish content data by selecting the publish button 290. The form page 265 can display other suitable mechanism for permitting the save, publish, or preview operations.

The user can preview the edited content data in order to view the appearance or format of the edited content data as it would appear on a display device such as a television. The preview button 295 may be used to perform the preview operation. In one embodiment, the edited content can be can be previewed by use of a web browser 291. It is noted that television content are formatted differently from Internet or personal computer content. In another embodiment, software, such as ActiveX may be used to pull up a television emulator on the computer so that a page can be viewed as it would appear in a television. Thus, the web browser 291 in FIG. 1 would be replaced by a TV emulator 291. The TV emulator can point to the HTML page that is being edited by the stringer.

The content tool 100 permits stored processes 300 (which may be software) to save edited (or added) content data to the save database 135 and retrieve content data that is saved in the saved database 135 for the user to view. The stored processes 300 can also check to make sure that edited or added content data is properly entered by the user. For example, if the user leaves out a name in the form page 265 (or if there are other errors), then the stored processes 300 will indicate to the user to provide a name (or indicate an error message to describe the error). The user can then enter the missing name (or correct the other error) and save the edited content data in the save database 135 by, for example selecting the save button 285. The stored processes 300 may then optionally send a message to the user to indicate that the edited content data has been successfully saved in the save database 135.

In one embodiment, when the edited or added content data has been saved, the publish button 290 may appear on the form page 265 to permit the user to publish the edited or added content data. By selecting the publish button 290, the user permits the stored processes 300 to duplicate selected saved content data in the saved database 135 into the live database 140. The stored processes 300 may optionally notify the user when a copy operation of saved content data from the save database 135 to the live database 140 has been successfully performed, and/or when saved content data has been published.

The display device(s) 155 can display content 125 in JPEG, PNG, and/or GIF format. As mentioned above, this content 125 is the content that has been selected to be published. However, other suitable formats may be used such as streaming video. The display device 155 can access the live database 135 if the device 155 is a subscribing device. The display device 155 may subscribe to, for example, MSTV, Liberate TV, or other TV browsers. In one embodiment, the live database 135 can store content 125 in a media table based on the media type. Thus, the live database 135 may include different media tables.

Figure 2:
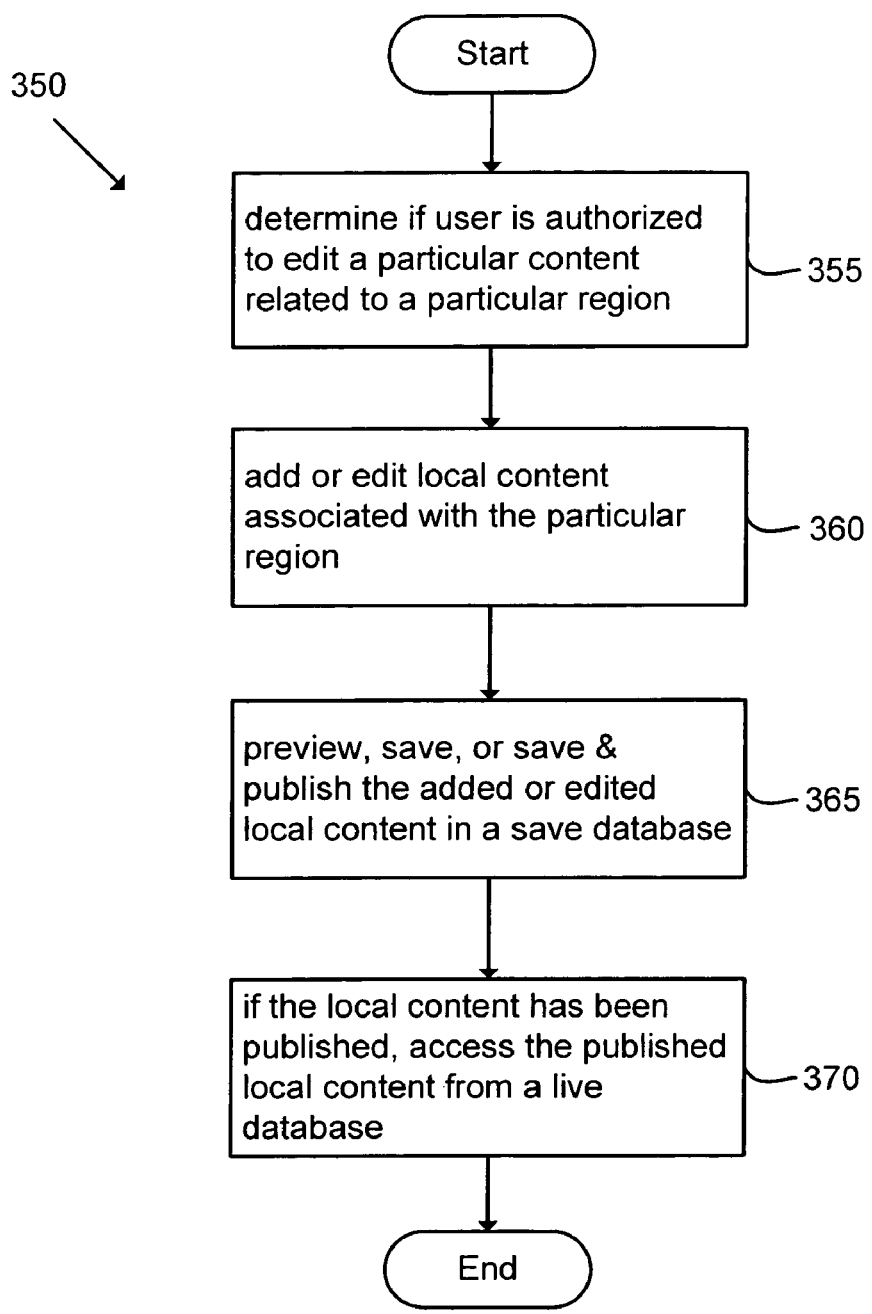
FIG. 2 is a flowchart of a method for local content entry and management according to an embodiment of the invention.

FIG. 2 is a flowchart illustrating a method 350 of editing content in accordance with an embodiment of the invention. A determination (355) is first made to check if a user is authorized to edit a particular content that is related to a particular region. If so, then the user can add or edit (360) local content associated with the particular region. The added or edited local content can then be processed (365). When processing (365) the local content, the user can then preview, save, and/or save and publish the added or edited local content in a save database. If the added or edited local content has been published, then subscribers can access (365) the published local content from a live database.

In one embodiment, the content 125 can be sized or re-sized at an upstream stage (e.g., prior to processing by the content tool 100). Alternatively, the content 125 can be sized or resized at the provider side (e.g., at the broadcast center 150).

Figure 3:
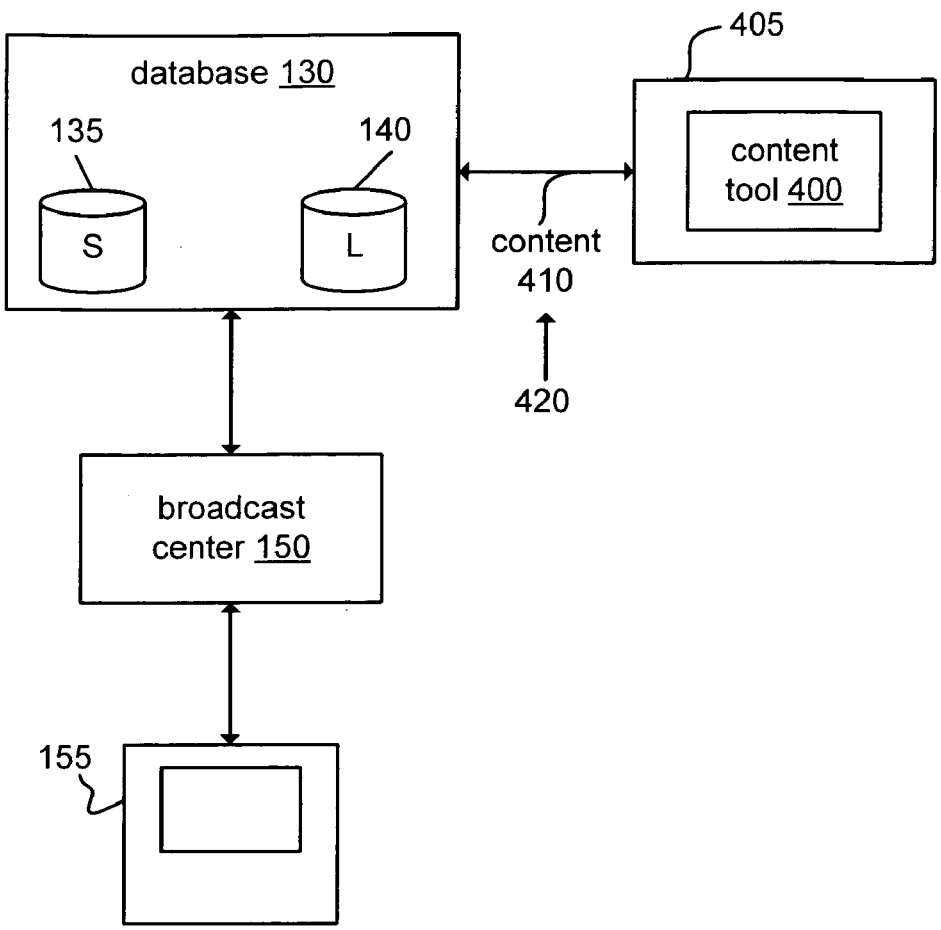
FIG. 3 is a block diagram of an apparatus for local content entry and management according to another embodiment of the invention.

FIG. 3 is a block diagram of a content tool 400 in accordance with another embodiment of the invention. The user can, for example, carry a portable handheld device 405 with the content tool 400. The content tool 400 can perform at least some of the various operations performed by the content tool 100 in FIG. 1. The user may add, edit, and/or save the local content 410 in the save database 135 and/or publish the local content 410 in the live database 140. In one embodiment, the handheld device 405 can communicate with the save database 135 and live database 140 by, for example, wireless transmission by use of a communications network 420 such as the Internet.

Figure 4:
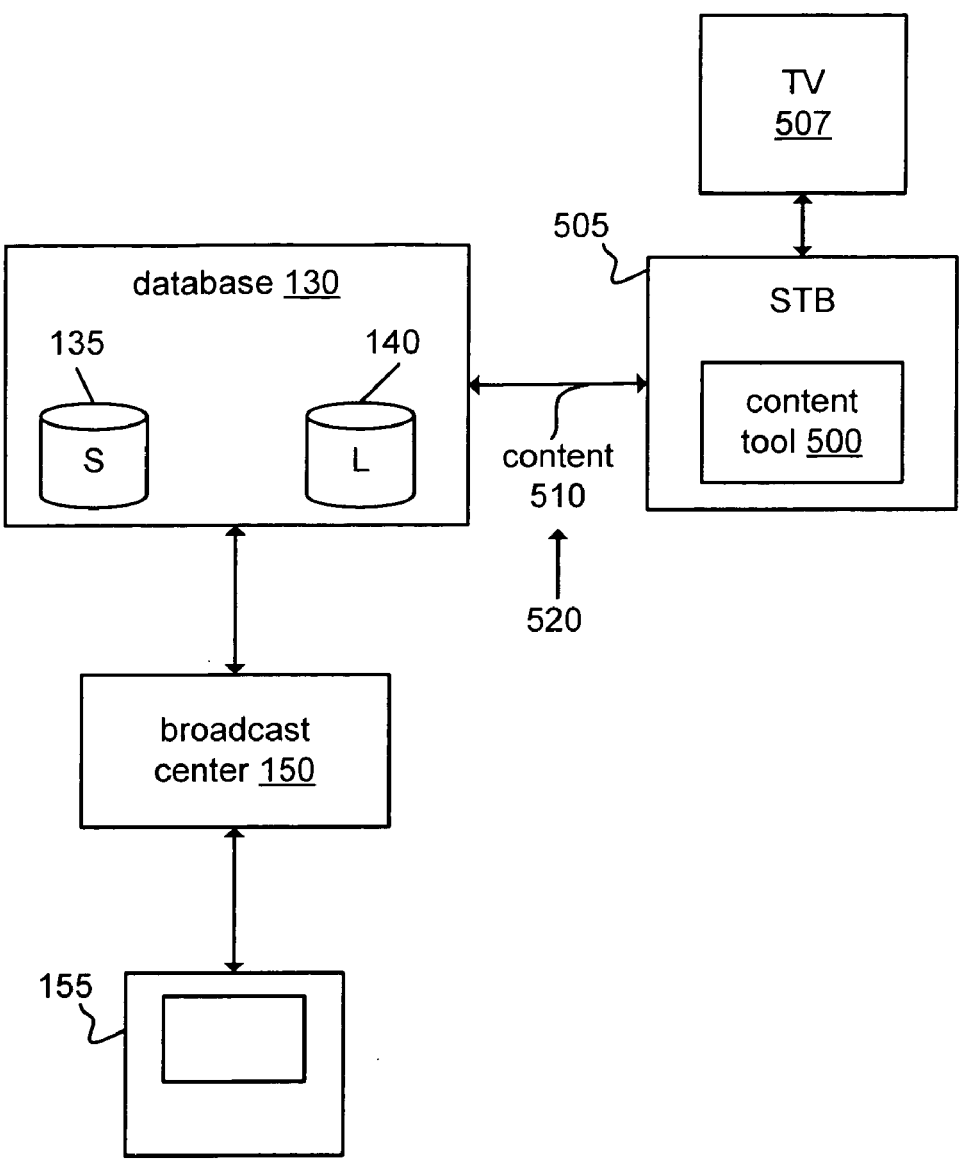
FIG. 4 is a block diagram of an apparatus for local content entry and management according to another embodiment of the invention.

FIG. 4 is a block diagram of a content tool 500 in accordance with another embodiment of the invention. A user of a set top box (or other customer premise equipment) 505 may be coupled to a television 507 and may, for example, add, edit, and/or save the local content 510 in the save database 135 and/or publish the local content 510 in the live database 140. In one embodiment, the set top box 500 can communicate with the save database 135 and the live database 140 by, for example, transmission by use of a communications network 520 such as the Internet. In this embodiment, authorized users may, for example, be required to review or edit the local content 510 in the save database 135 before publication of the local content 510 via the live database 140.

Figure 5:
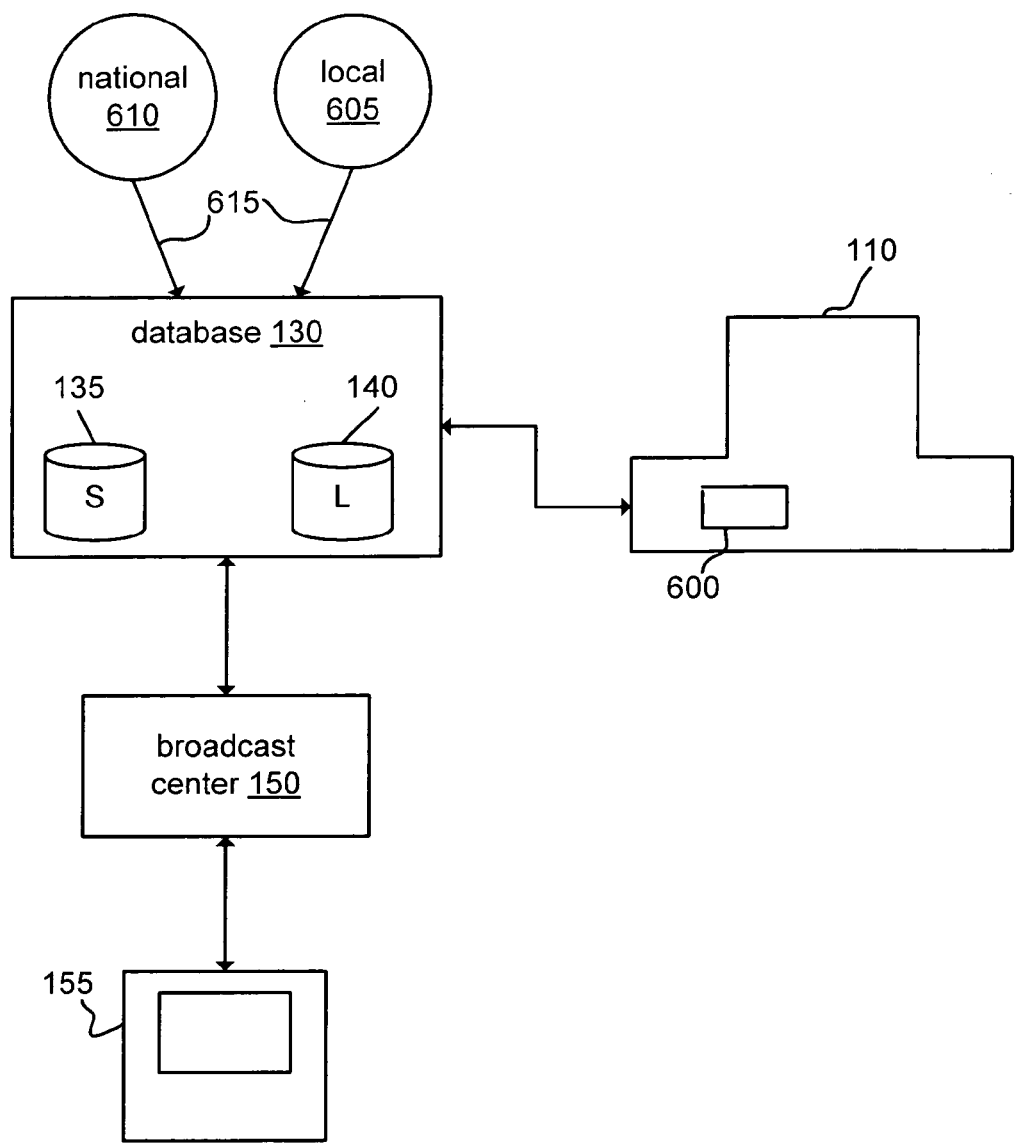
FIG. 5 is a block diagram of an apparatus for local content entry and management according to another embodiment of the invention.

FIG. 5 is a block diagram of a content 600 tool in accordance with another embodiment of the invention. Local sources 605 (or nation-wide sources 610 such as TSN) can provide added content 615 to the save database 135. Authorized users (via content tool 600) can then review and or edit the added content 615 before permitting the added content 615 to be published via live database 140.

Embodiments of the present invention may be advantageously utilized for any system that may be adapted to receive and manage content, and thus are not limited to apparatus as described in the foregoing embodiments.

The various engines or software discussed herein may be, for example, software, commands, data files, programs, code, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching.

Further, at least some of the components of this invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus for managing local content data, the apparatus comprising:
    a content tool configured to permit the edit of local content related to a particular region for an authorized user; and
    a processor configured to execute the content tool to permit edit of the local content, wherein the content tool permits edit of local content by a provisioned user.

2. The apparatus of claim 1, further comprising:
    stored processes for permitting the content tool to communicate with a database system.

3. The apparatus of claim 2 wherein the database system is configured to accept added content.

4. The apparatus of claim 3 wherein the added content is reviewed by use of the content tool prior to publication of the added content.

5. The apparatus of claim 1, wherein the database system includes a save database configured to store local content.

6. The apparatus of claim 1, wherein the database system includes a live database configured to store local content designated for publication by the content tool.

7. The apparatus of claim 1, wherein the content tool is coupled to a web browser to permit viewing of the local content prior to publication of the local content.

8. The apparatus of claim 1 wherein the content tool can communicate with the database system by a wireless network.

9. The apparatus of claim 1 wherein the content tool can communicate with the database system by a wired network.

10. The apparatus of claim 1 wherein the content tool is implemented in an interactive television system.

11. The apparatus of claim 1, wherein the content tool determines if a user is a provisioned user based upon user information provided by the user.

* * * * *